INVENTORS.
LLEWELLYN T. BARNES
CHARLES T. BARNES
BY Blum, Moscovitz
Friedman & Blum

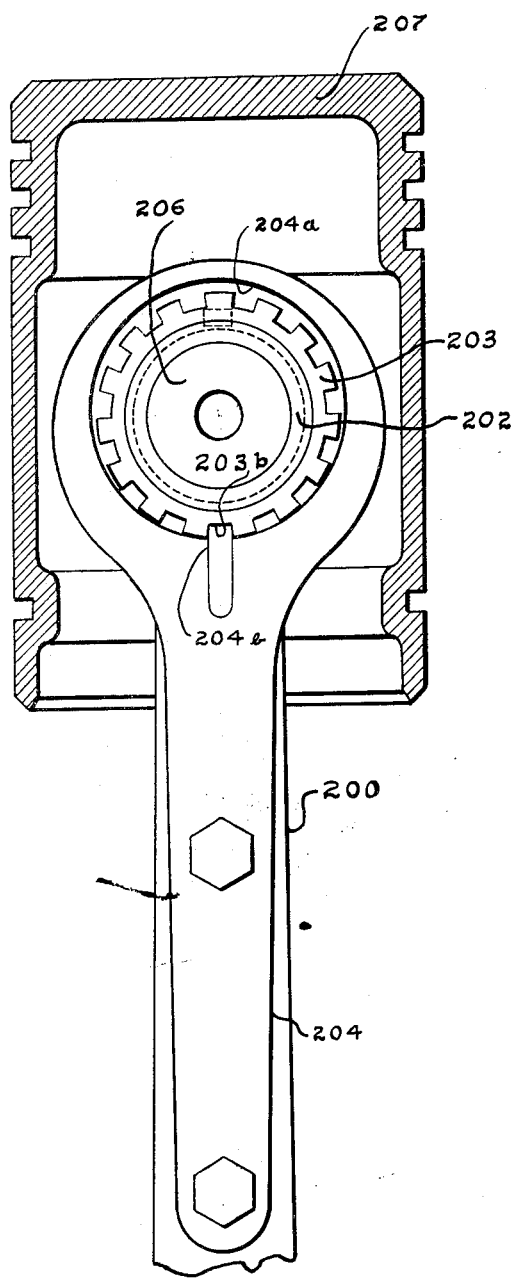
FIG. 6.
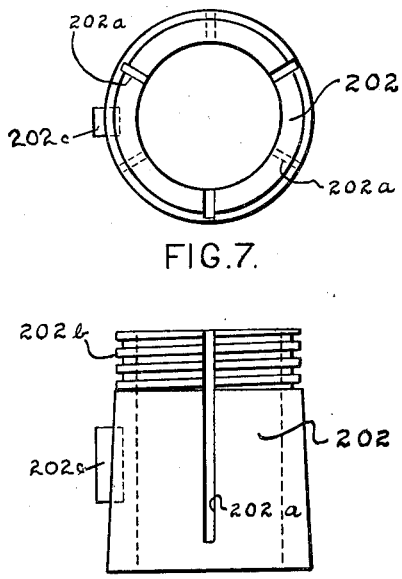
FIG. 7.
FIG. 8.
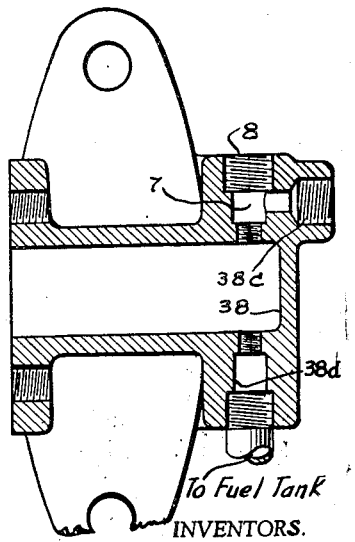
FIG. 13.
INVENTORS.
LLEWELLYN T. BARNES
CHARLES T. BARNES
BY Blum, Moscovitz,
Friedman & Blum

INVENTORS.
LLEWELLYN T. BARNES
CHARLES T. BARNES

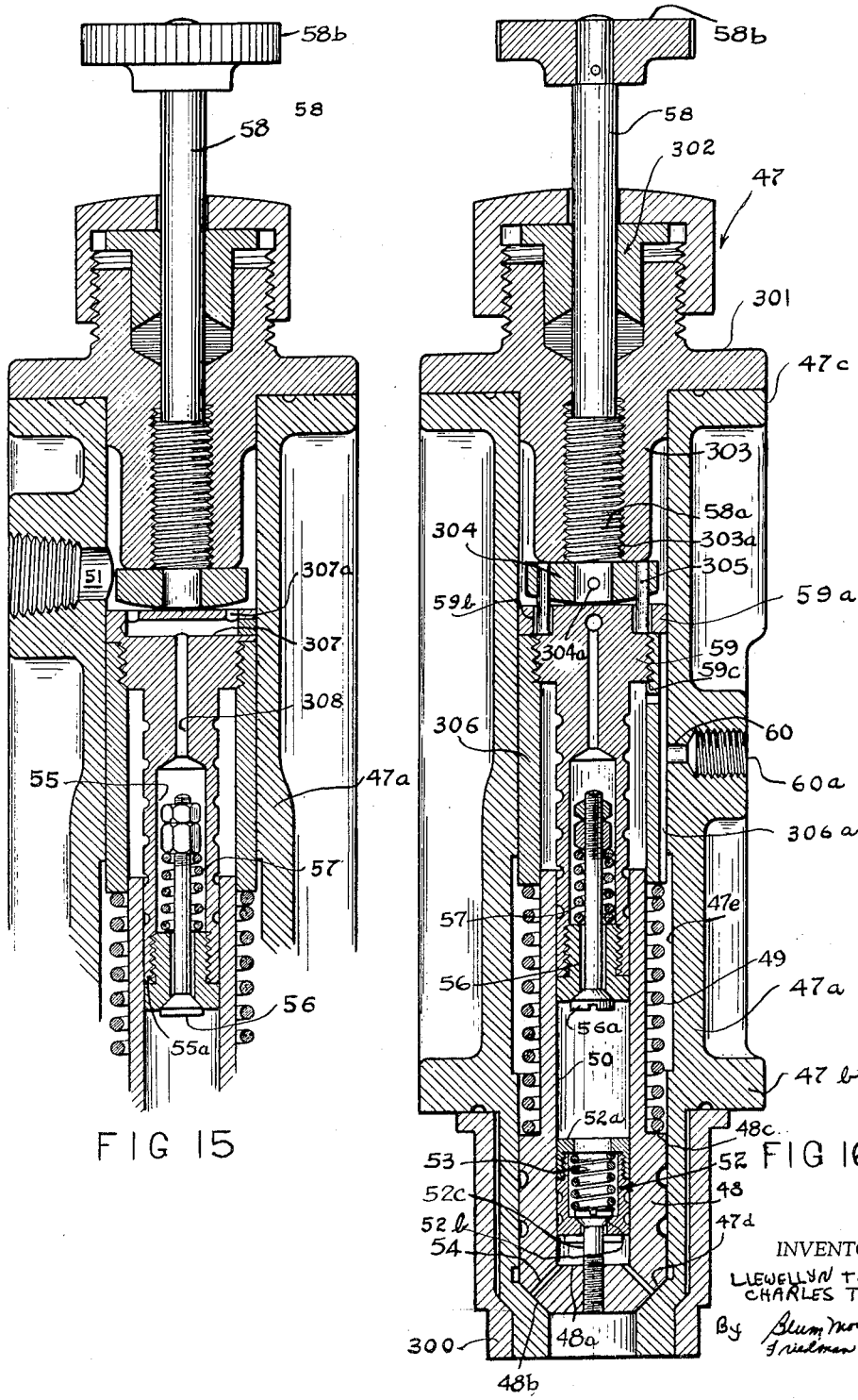

United States Patent Office 3,033,181
Patented May 8, 1962

3,033,181
INTERNAL COMBUSTION ENGINE
Llewellyn T. Barnes and Charles T. Barnes, both of 155 Atlantic Ave., Freeport, N.Y.
Filed Aug. 31, 1959, Ser. No. 837,228
10 Claims. (Cl. 123—25)

This invention relates to improvements in internal combustion engines, and in particular relates to internal combustion engines embodying a number of new concepts so as to make their efficiency far greater than that of conventional internal combustion engines in present common use.

Internal combustion engines commonly have cycles which are variations of the ideal Carnot's cycle, which has in theory an efficiency of approximately 79% in converting heat into work.

As typical examples of efficiencies of existing engines, an engine having a constant volume cycle, which corresponds to the type of gasoline engine used in automobiles, may have a thermal efficiency of approximately 20–23%. An engine having a constant pressure cycle may have a thermal efficiency of approximately 30–34%. The slow speed Diesel engine which is a modified constant pressure engine may also have a thermal efficiency of approximately 30–34%. Some other engines of special or unusual construction have achieved thermal efficiencies of approximately as high as 40–42%.

An important object of this invention is to produce a reciprocating internal combustion engine having a thermal efficiency of as high as 60–70%.

A further important object of this invention is to provide a reciprocating internal combustion engine, the combustion chamber of which is maintained at relativley constant wall temperature regardless of speed or load over the entire cycle of operation.

Another object of this invention is to provide an engine in which it is unnecessary to dissipate heat wastefully from the combustion chamber after the burning of the fuel, the heat being utilized, instead, to convert water into superheated steam which is injected into the combustion chamber to assist the piston in its power stroke.

As an important feature of the invention, because of effective utilization of the heat of the fuel explosion rather than dissipation of a substantial portion of the heat through the exhaust, the engine is quiet and exhaust noises are virtually eliminated.

Another object of this invention is to provide a reciprocating internal combustion engine which does not require a conventional carburetor, an electric ignition system, a water jacket, air cooling fins, or an exhaust muffler.

As another feature of this invention, the improved operating qualities of a two-cycle engine in accordance with this invention are so great that in many applications it may be possible to replace the Otto-cycle or four-cycle engine by a two-cycle engine in accordance with this invention.

As an important feature of this invention, the reciprocating internal combustion engine in accordance with this invention operates on what may be considered to be a composite cycle, which combines the advantages of the cycles of prior known engines. For convenience, this cycle may be designated as a binary regenerated combustion and steam cycle. In the first part of the cycle, a mixture of fuel, vapor and air is injected into the cylinder according to novel principles which will be explained below. After the explosion of this primary fuel air mixture, and just after the piston has begun its power stroke, superheated steam is expanded within the cylinder and further propels the piston in its power stroke.

Put in other terms, when a reciprocating piston of an internal combustion engine operates a crank, there is a minimum mechanical efficiency in exploding the fuel air mixture at the very end of the compression stroke, because at this time the piston and the crank rod are in line and there is no torque exerted on the crank, regardless of the power of the explosion. One purpose of this invention is to provide a delayed main explosion which occurs after the piston has begun its power stroke, which is after it has passed top dead center with relation to the crank.

The piston is pushed, as in a steam engine, to obtain more uniform action than is obtained by the explosive action of the usual internal combustion engine. In this way, the power stroke achieves some of the advantages of the steam cycle of the "Corliss" design while at the same time avoiding some of the disadvantages of a steam engine or steam boiler.

Other objects and advantages of this invention will become apparent from the following description, in conjunction with the annexed drawings, in which preferred embodiments of the invention are disclosed.

In the drawings:

FIG. 6 is a sectional view on line 6—6 of FIG. 5.

FIG. 7 is an end elevation view of one of the parts in the assembly of FIG. 5.

FIG. 8 is a side elevation view of the parts shown in FIG. 7.

FIG. 13 is a detailed sectional view of part of the charger assembly.

FIG. 15 is a vertical sectional view of one embodiment of an inspirator assembly.

FIG. 16 is a vertical sectional view similar to FIG. 15, but taken at right angles thereto.

GENERAL DESCRIPTION

Figure 1:
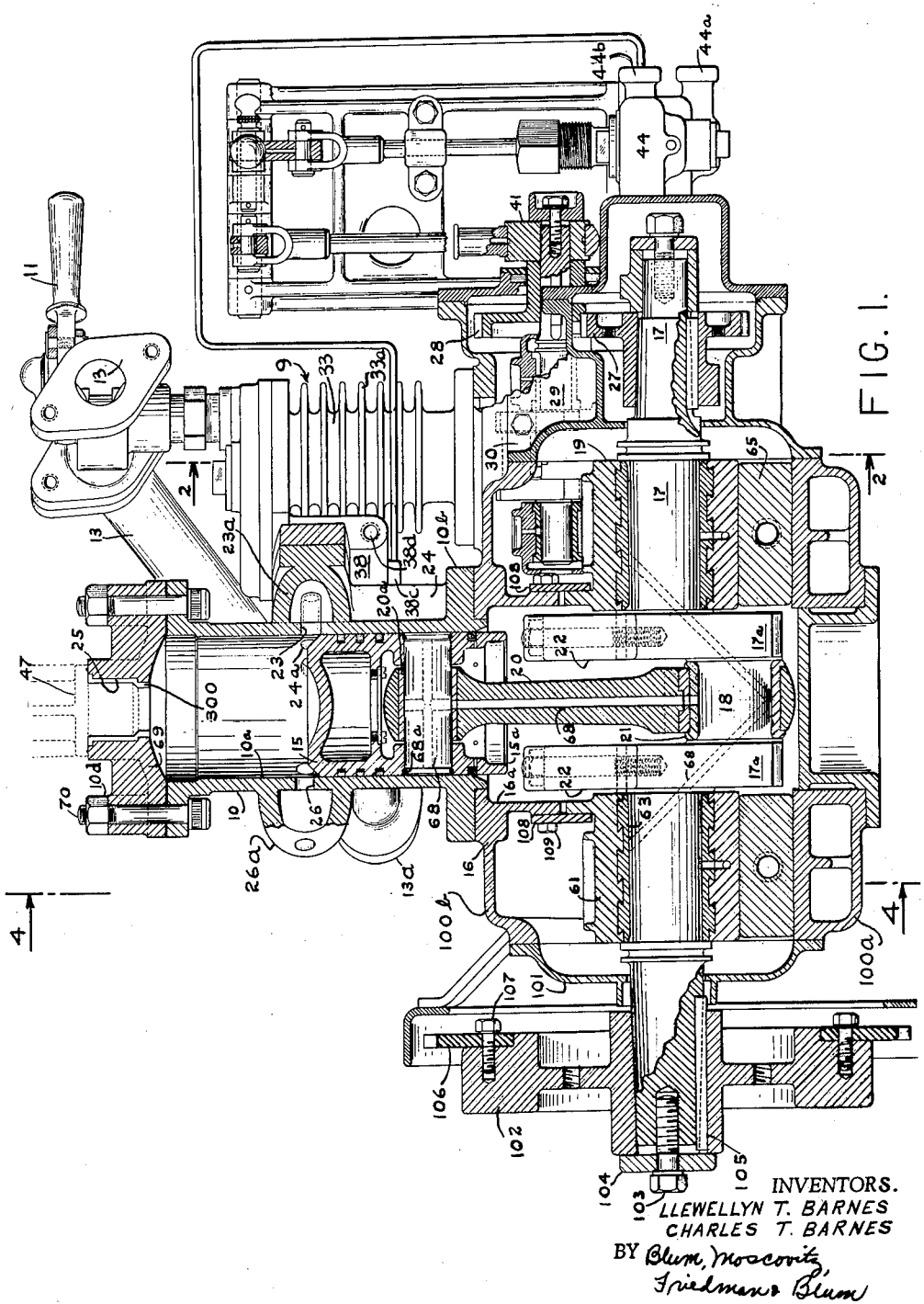
FIG. 1 is a vertical section of my improved engine.

By way of illustration, the drawings show a one-cylinder engine having a cylinder 10, piston 15, crank shaft 17 and operating elements coupling the reciprocating piston 15 to said crank shaft 17.

Said cylinder 10 has three sets of ports 12, 23, 24a, and 26. Ports 26 are located at the approximate center of the cylinder and just above ports 23 and 24a and are intended for the exhaust or scavenging of gases from the cylinder after their explosion. Ports 23 receive an air-fuel vapor mixture under compression in a manner to be explained below. Ports 24a receive compressed air from crank case chamber 16a. Ports 12, which are located below the above two ports, receive air at the start of the downward or power stroke of piston 15, by reason of vacuum in crank case chamber 16a. This air is compressed within the crank case chamber by the downward movement of piston 15.

Figure 2:
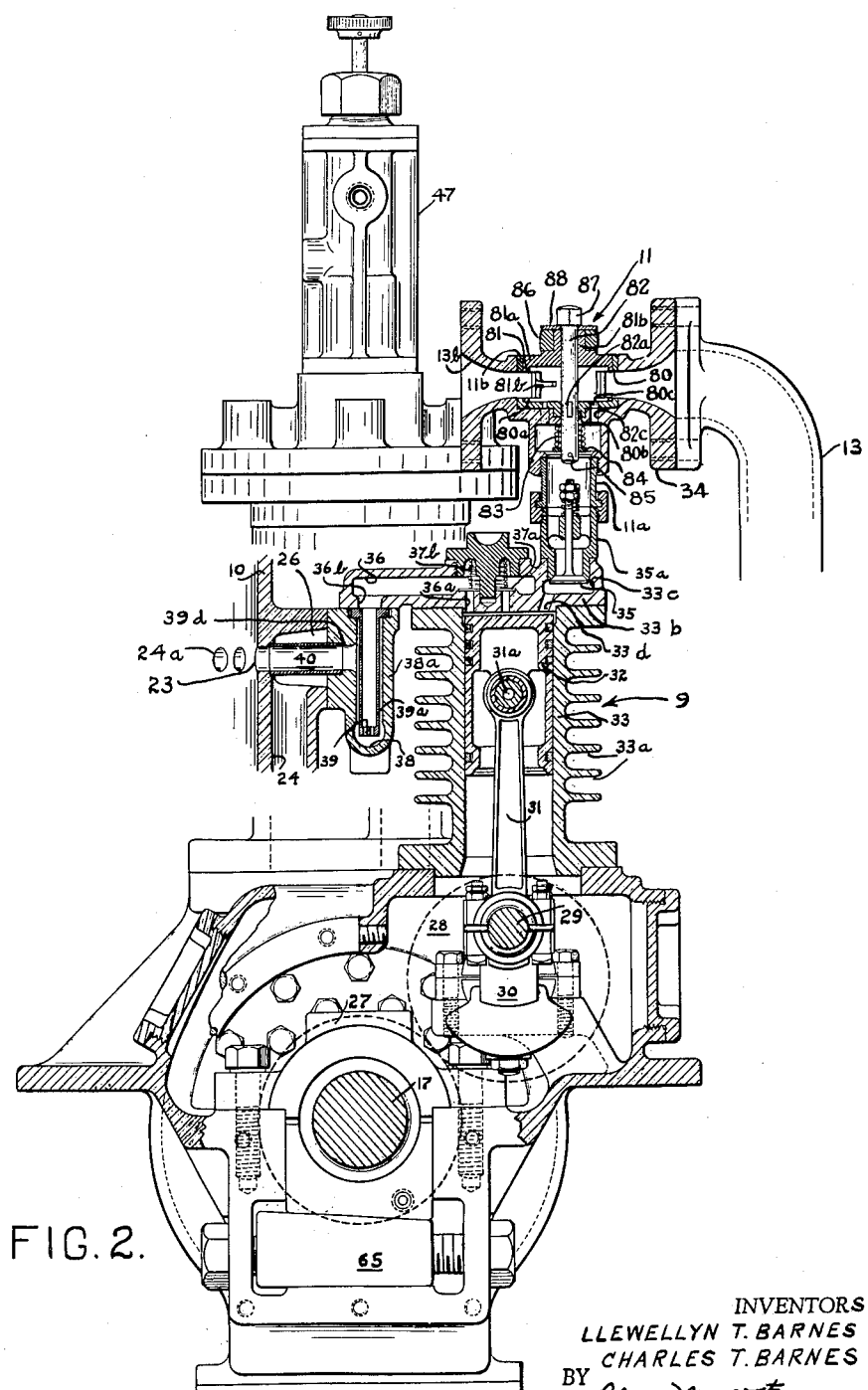
FIG. 2 is a sectional view on the line 2—2 of FIG. 1.

The fuel-air vapor mixture is supplied to port 23 from a charger shown in FIG. 2 and other views. This charger includes operating piston 32 which is coupled to crank shaft 17 in such a way as to reciprocate in the opposite direction to main piston 15. Piston 32 moves in cylinder 33 having cooling fins 33a. In other words, during a downward or power stroke of piston 15, piston 32 is moved upwardly in a compression stroke. During an upward or compression stroke of piston 15, piston 32 is moved in a downward stroke. During the down or intake stroke of piston 32, air enters the top of cylinder 33 via throttle 11 and associated parts.

During the upward or compression stroke of piston 32, air under pressure is forced through the tube 36 and a porous unit with air holes 39 and into a surrounding mixing chamber 38. This mixing chamber 38 receives a continuous charge of liquid fuel from a fuel pump 44 (FIGS. 1 and 3) delivered into a puddle in chamber 38.

The charge of air under pressure vaporizes a portion of the fuel in the puddle in chamber 38, to form a saturated fuel vapor-air mixture, and the resulting ignition mixture is fed through pipe 40 to inlet port 23. This mixture is diluted with air from inlet ports 24a, which is received from crank case chamber 16a.

The charge in the main cylinder 10 is compressed by upwardly moving main piston 15, and ignites from heat of compression at the end of the upward stroke of the piston, without electric ignition. This starts the power stroke of piston 15.

The water or steam inspirator 47 is generally shown in FIGS. 2, 3, 4, 15 and 16. This has a plunger 48 which is actuated by the force of the explosion to permit water to enter the top of cylinder 10 after the explosion, and for the purpose of cooling the gases which are to be exhausted through ports 26. The water cools the burned gases by absorbing their heat and is converted into superheated steam. This steam reacts with heavy fuel which is simultaneously injected into the top of cylinder 10 from inspirator 47, and the resulting force of reaction aids in driving piston 15 downwardly. After the piston clears ports 26, the exhaust gas resulting from the ignition explosion and any further gas resulting from the power explosion of the heavy fuel are exhausted through ports 26. At this time, the pressure is reduced to one atmosphere.

*Main Cylinder and Crank Case*

Figure 4:
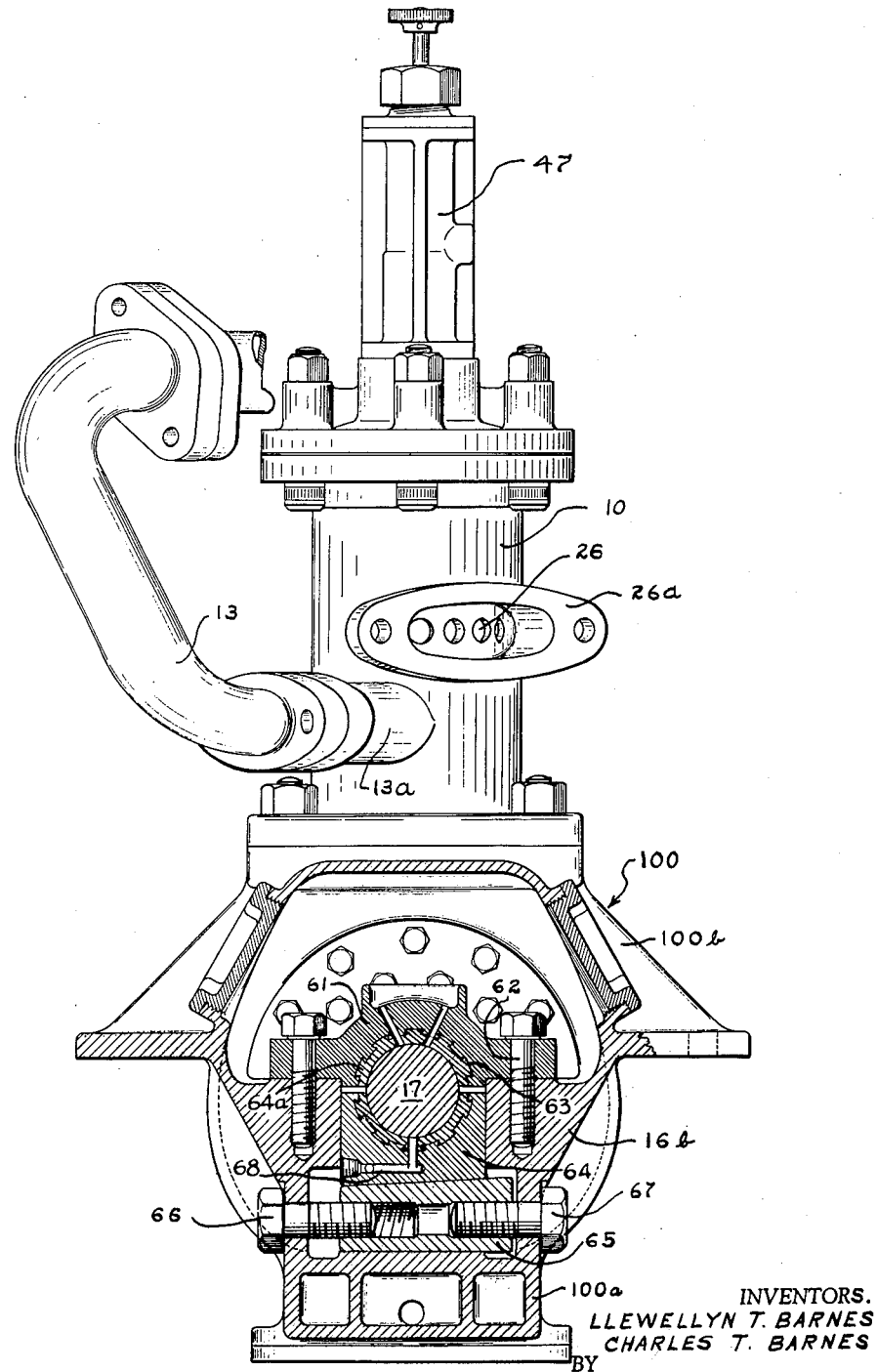
FIG. 4 is a sectional view on line 4—4 of FIG. 1.

This assembly includes a frame 100 which is optionally cast in one part and includes a base 100a, crank case 16 and upper portion 100b, all of which are shown in FIGS. 1 and 4.

Main bearing adjusting blocks 65 rest upon base 100a and are spaced longitudinally from each other. As viewed in cross-section (FIG. 4), these blocks are wedge-shaped. Adjusting screws 66 and 67 extend through opposed and aligned openings in the frame and into screw-threaded longitudinal bores of block 65, as shown in FIG. 4. As a result, by loosening one screw and tightening the other, each block 65 may be moved in either direction transversely to the axis of crank shaft 17.

The lower half 64 of the main bearing rests frictionally upon block 65. Bearing portion 64 is of metal and has a semi-cylindrical top recess. The upper bearing portions 61 rest upon shoulders 16a which are integral with base 100a, and are fixed in place by means of screws 62. Each bearing portion 61 has a semi-cylindrical bottom recess. The two bearing halves 61 and 64 rotatably mount crank shaft 17 within their composite cylindrical recess. The bearing portions which are in contact with shaft 17 are optionally made of Parson's white brass. Since the upper bearing portion 61 is fixed to the frame 100, the limits of movement of piston 15 (which is connected to crank shaft 17) remain fixed and its top dead center position never varies relative to cylinder 10. Therefore, adjustment of the bearings of crank shaft 17 to take up wear of the bearings has no effect upon the operation of the engine. Any bearing wear is compensated by manipulation of screws 66 and 67. This makes it unnecessary to have precision ball-bearings.

As shown in FIG. 1, shaft 17 extends outwardly to the left of base 100a and has an oil guard 101. Outwardly of oil guard 101, shaft 17 is tapered to fit the correspondingly tapered hub of fly wheel 102, which latter is drawn up upon shaft 17 by means of screw 103 and washer 104. Fly wheel 102 is keyed to shaft 17 by key 105. Starter gear 106 is secured to fly wheel 102 by screws 107. Gear 106 may be engaged by any suitable starting means. Such power starting means are not shown.

Crank shaft 17 has the usual crank offset 17a intermediate the main bearings. Counter weights 22 are mounted on crank offset 17a in the usual manner. Connecting rod 20 is connected to crank pin portion 18 of crank 17a, and is connected to cylindrical piston 15, which is slidable in the bore 10a of cylinder 10 (shown in upright position) in a manner described hereinafter.

The lower end of cylinder 10 has a square flange 10b, which rests upon the top of the crank case and is secured thereto by bolts 10c. Near the bottom of the cylinder, it is provided an integrally cast outwardly projecting boss 13a having an end flange of increased size. Thus, pipe 13 may be secured to boss 13a by the usual fitting. As shown, the boss 13a has an oval bore and there are a plurality of ports 12 drilled through the wall into the cylinder within the interior space of boss 13a. A similar boss 26a having interior communication with exhaust ports 26, and shown in FIG. 4, is located above boss 13a. Although not shown in FIG. 4, there is a third boss located on the opposite side of the cylinder and intermediate in height between bosses 13a and 26, and designated by the reference numeral 23a. This boss 23a has interior communication with both port 23 and four further ports 24a, two on each side of the central port 23. In this case, a pipe 40 of relatively small diameter extends through boss 23a and communicates with port 23.

All holes in the crank case are covered by pressure plates. Thus, semi-circular plates 108 fixed by bolts 109 to the casing cover the clearance holes required for insertion of the upper main bearing members. Similarly, all holes resulting from the use of adjustable bearings are covered by such pressure plates. Certain details of the pressure oil lubricating system and certain piston rings are not described since they are conventional.

*Attachment of Piston and Connecting Rod*

FIG. 1 shows the connecting rod 20 as having a cylindrical transverse bore which is lined by a cylindrical bushing 20a. Piston pin 68 extends turnably through the bore of cylindrical bushing 20a and into opposed bores of piston 15, being held in place by snap rings 68a.

FIGS. 5–9 show an alternate arrangement which is preferred, particularly in the case of larger engines.

In the case of larger engines, it is sometimes desirable to permit adjustment of the fit of the piston pin to take up wear. As shown in FIGS. 5–9, connecting rod 200 (which corresponds to rod 20 of FIG. 1) has a frustro-conical transverse bore 201. A correspondingly externally tapered bushing 202 extends frictionally into said bore 201. Bushing 202 has a key 202c which extends into a corresponding keyway 201a in bore 201. This bushing 202 has a cylindrical bore. Bushing 202 is split by means of a plurality of radially extending end slots. By way of example, there may be three such slots 202a extending inwardly from each end face of bushing 202 and equally disposed circumferentially.

Slots 202a of the respective ends alternate with each other in the manner shown in FIG. 7. These slots extend only part-way through the bushing. The effect is to make it possible to contract the respective end portions of bushing 202 to take up wear. At its end of smallest diameter, bushing 202 is provided with a square screw thread 202b, as shown in FIG. 8. This end of bushing 202 protrudes beyond the corresponding face of connecting rod 200. A serrated nut 203 is screwed onto the protruding end of bushing 202, this nut 203 having an internal thread 203a. Nut 203 is provided around its periphery with axially extending notches 203b, so as to provide the serrations.

A part 204, which is designated as a spanner, is fixed to connecting rod 200. This spanner 204 is an elongated blade spring whose lower portion is fixed to rod 200 by means of locking member 205 of any suitable type. The upper portion of spanner 204 is of generally annular shape, through the opening 204a of which nut 203 extends. The opening 204a is generally of greater diameter than nut 203. Opening 204a is preferably slightly elongated in the vertical direction, so as to be vertically movable with respect to nut 203.

A tongue 204b extends upwardly into the lower portion of opening 204a and is located on the axis of spanner 204. This tongue 204b is of a size and shape to mesh with a notch 203b of nut 203. FIG. 6 shows said tongue 204b in mesh with a particular notch 203b of nut 203. When it is desired to adjust the bushing, fastening elements 205 may be temporarily removed so as to permit spanner 204 to be lowered slightly so that tongue 204b clears opening 203b.

Figure 5:
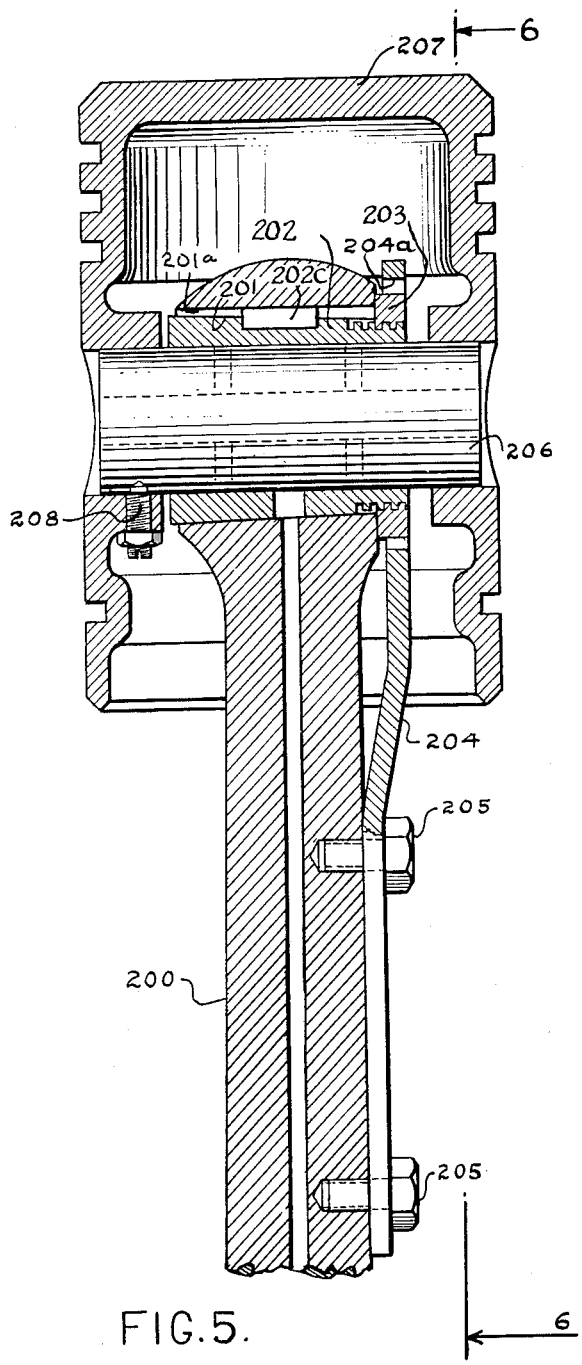
FIG. 5 is a vertical sectional view through the piston and connecting rod, on an enlarged scale and in the same vertical plane as FIG. 1.
Figure 9:
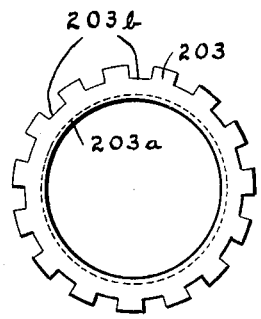
FIG. 9 is an end elevation view of another of the parts shown in the assembly of FIG. 5.

Nut 203 may be turned slightly so as to draw bushing 202 to the right, as taken in FIG. 5, and thereby take up the wear of piston pin 206 and of bushing 202. The slots 202a permit the necessary contraction of the ends of bushing 202 when it is drawn to the right. Spanner 204 may then be raised again so as to mesh projection 204b in another notch 203b and may again be secured to connecting rod 200 by means of fastening members 205.

Piston pin 206 is cylindrical and extends through the bore of bushing 202 and beyond the ends thereof and into opposed bores of the cylindrical piston 207 (which corresponds to piston 15). Optionally, any suitable means, such as locking screw 208, may be provided to secure piston pin 206 to piston 207.

*Charger*

Charger 9 is shown in FIGS. 1 and 2, and in certain detail views.

A gear 27 is mounted on main crank shaft 17. This meshes with an equal gear 28 on auxiliary crank shaft 29. This auxiliary crank shaft 29 has the usual check 30, and connecting rod 31 is mounted in the usual way on crank shaft 29. This connecting rod 31 extends up into the compressor cylinder 33 and is connected by pin 31a, in the usual manner, to compressor piston 32. Accordingly, piston 32 can slide up and down in the bore of compressor cylinder 33. Compressor cylinder 33 has external air cooling fins 33a.

The cylinder head 33b has an air compression chamber 33c which connects by passage 33d to the top of the internal space of cylinder 33.

Air compression chamber 33c extends to the top of head 33b, and its upper portion receives a valve housing 35a which contains one-way air inlet check valve 35. This inlet valve 35 is adapted to receive air from throttle 11 in a manner which will be described below. Head 33b also has a discharge air chamber 36 which connects at its bottom with an annular passage 36a. This annular passage 36a connects at its lower end with the top of the internal space of cylinder 33 and is adapted to be closed at its upper end by valve plate 37a. This plate 37a is biased to closing position by means of coil spring 37b.

It will be apparent that air is admitted through valve 35 and inlet chamber 33c to the cylinder 33 during the downward stroke of piston 32. During the upward stroke of piston 32, the air in cylinder 33 and chamber 33c is compressed until the pressure is sufficient to overcome the force of spring 37b, at which point air is discharged into the chamber 36.

Figure 11:
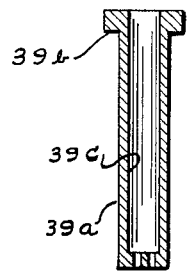
FIG. 11 is another sectional view of the part shown in FIG. 10.
Figure 12:
FIG. 12 is a bottom plan view of FIG. 10.
Figure 10:
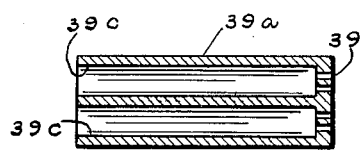
FIG. 10 is a partial vertical sectional view, drawn to enlarged scale, of one of the parts shown in the assembly of FIG. 2.
Figure 14A:
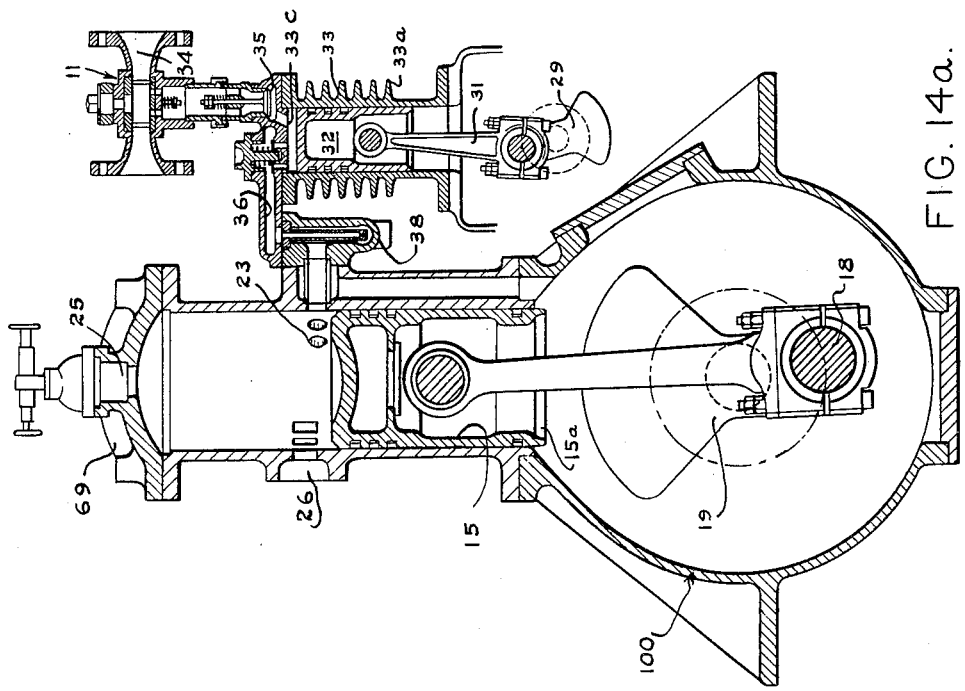
FIGS. 14 and 14a are transverse sectional views illustrating the piston and associated parts of the engine in two different positions, certain parts shown in each figure being omitted in the other.
Figure 14:
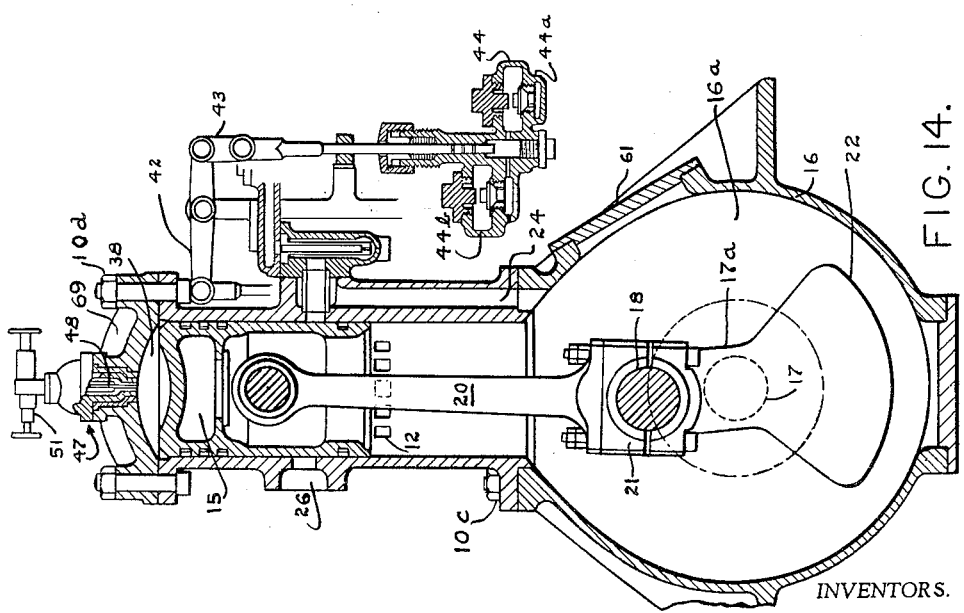

Said chamber 36 and the portion of the head in which it is located is off-set with respect to cylinder 33, and the head has an off-set bottom port 36b which communicates with chamber 36. A generally rectangular housing 38a, which is open at its upper end, is fixed to head 33b in such a way that the inner space of housing 38a communicates with port 36b. A diffuser tube 39a is set into housing 38a. This tube 39a is shown in detail in FIGS. 10, 11 and 12.

Said tube 39a is of generally rectangular shape and has an enlarged head 39b which is seated in the housing 38a in the manner shown in FIG. 2 and held in place by head 33b. Diffuser tube 39a has two cylindrical bores 39c and has holes 39 in its bottom wall, respectively communicating with said bores 39c. Diffuser tube 39a, is made of sintered bronze and has a peripheral wall which is porous to air. The external surface of tube 39a is preferably spaced from the internal wall of housing 38a.

Housing 38a has a transverse discharge port 39d intermediate the ends thereof. Pipe 40 is secured in communication with port 39d by any suitable means. Pipe 40 extends into the central opening of boss 26 which abuts housing 38a, and into port 23. The bottom of the internal space of housing 38a is designated by the reference numeral 38 and is slightly enlarged and concave and is hereinafter designated as the puddle chamber.

Said puddle chamber receives air through ports 39. In addition, said chamber 38 receives fuel, which may be gasoline, or light oil, or any other suitable fuel.

Figure 3:
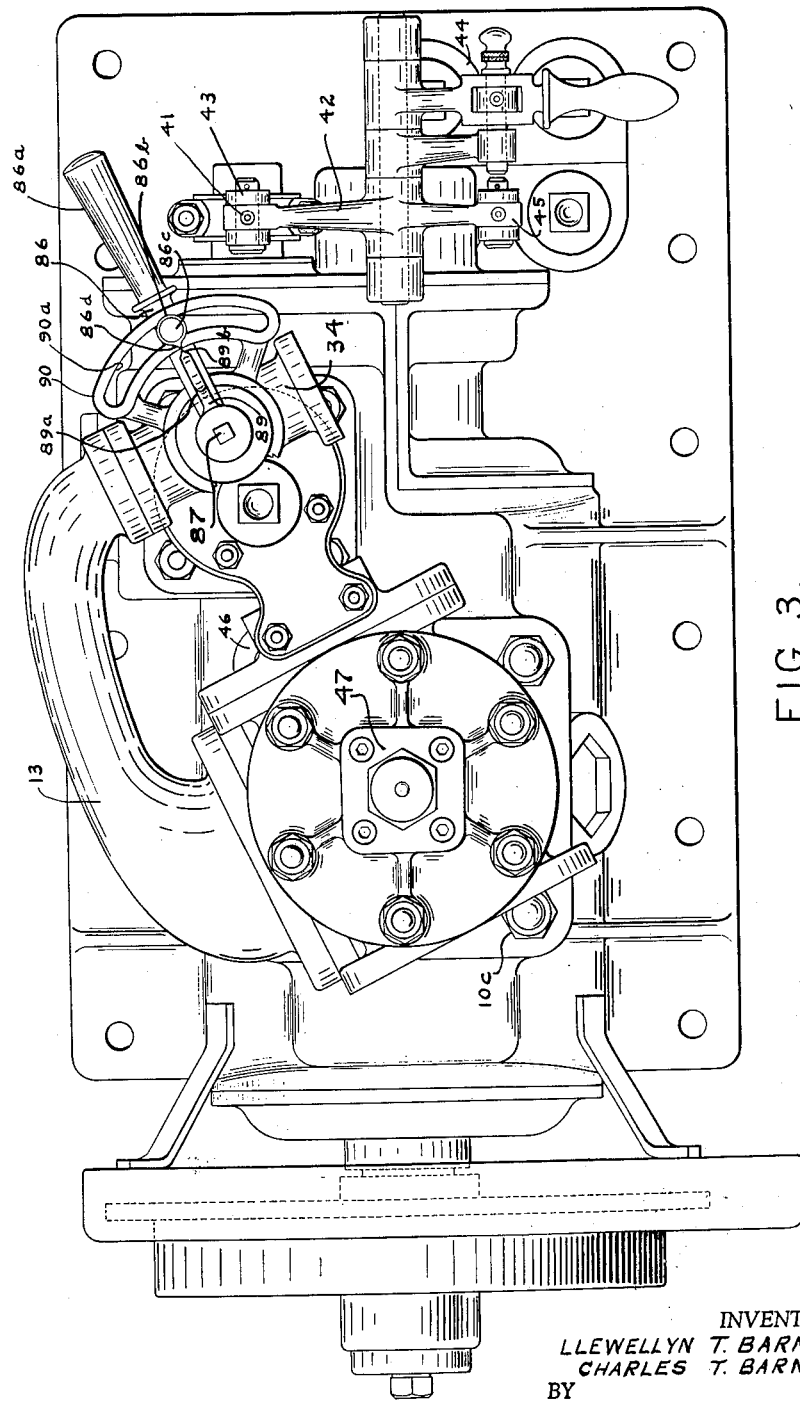
FIG. 3 is a top plan view of my improved engine.

The fuel may be supplied by any suitable fuel pump, such as fuel pump 44 shown in FIGS. 1 and 3. Said fuel pump 44 is conventional and is not described in detail. It has an inlet 44a and an outlet 44b. Said outlet 44b is connected by any suitable means (not shown) to the interior space of hollow boss 38c of housing 38a. (See FIGS. 2 and 13). The interior space of boss 38c communicates through needle valve bore 8 with puddle chamber 38.

A hollow bushing fits in the space 7 below the needle valve and screws into the recess for communication with chamber 38 and serves to control the amount of fuel oil which is supplied to puddle chamber 38. Said chamber 38 has an overflow outlet 38d which is connected by any suitable means (not shown) to the fuel tank (not shown).

*Throttle*

Throttle 11 (FIGS. 1, 2 and 3) is mounted upon the casing 35a for valve 35, by means of union 11a. Throttle 11 serves to control the air intake of charger 9, as well as the air intake of the master cylinder 10.

The housing of throttle 11 has an intake 13b which is adapted to be connected through any suitable air cleaner (not shown) to the outside atmosphere. Said air inlet 13b is connected by pipe 13 to boss 13a on main cylinder 10 and hence through ports 12 to the interior of main cylinder 10 and hence to the crank case. It will be understood, of course, that ports 12 are blocked by piston 15 except when main piston 15 is in its upward position.

The casing of throttle 11 has a top bore 11b of cylindrical shape which receives the throttle assembly. The throttle assembly includes a cylindrical member 80 having a bottom wall 80a formed with a central aperture 80b and a plurality of ports 80c of varying diameter. Member 80 is turnable within housing bore 11b. The throttle also includes a further cylindrical member 81 which fits turnably within recess 11b and which has a top wall 81a. A central shaft 82 extends turnably through an opening in the top wall 81a and also through opening 80b and below wall 80a. Below the top wall of the casing of throttle 11, a spring 83 and washer 84 are fixed in place on shaft 82 by cotter pin 85. By means of key 82a and the usual key slot (not shown), shaft 82 is keyed to bottom wall 80a. The upper portion 81b of wall 81a is square and receives throttle lever 86 by extending through a square opening thereof. Shaft 82 has a square key member portion 87 above lever 86 and separated therefrom by washer 88. Auxiliary throttle lever 89 is fixed upon key member 87.

Quadrant member 90 is fixed to the casing of throttle 11 and has a curved part-circular slot 90a. Lever 86 has a usual handle 86a and has a friction guide member 86b slidably received within slot 90a, culminating in an end head 86c which has a pointer 86d facing toward shaft 82. Lever 89 has a free end thumb portion 89a. This has a pointer 89b adapted to be lined up with pointer 86d when desired.

Lever 89a is slidably frictionally engaged by lever 86 in a manner which is not shown. Lever 89 may be turned independently of lever 86. However, once lever 89 is set relative to lever 86, the two levers turn in unison when handle 86a is manipulated. When lever 89 is turned, it turns member 87 and hence turns shaft 82, and hence turns member 80. The ports 80c of member 80 are adapted to register or not, as the case may be, with corresponding ports 82c of varying diameters in the top wall of the casing of throttle 11. Accordingly, by turning lever 89, the registration of ports 80c and 82c is varied and hence the flow of air to valve 35 is varied.

When lever 86 is turned, member 81 is turned. Member 81 has ports 81b which register fully with the chambers of members 34 in one postion of member 81, and which are completely out of registration therewith in another turned position of member 81. From this, it will become apparent that lever 86 controls air flow to the main crank case, and lever 89 controls air flow to the charger. Lever 89, therefore, controls the richness of the fuel air mixture fed through ports 23 and 24a to the master cylinder, and lever 86 controls the main flow of air to the chamber.

Lever 86 can control the speed of the engine for varying mixture ratios of the fuel, and the richness of the fuel can be adjusted to the optimum ratio for any given setting of the main throttle 11.

*Inspirator (FIGS. 15 and 16)*

FIGS. 15 and 16 show a first embodiment of the inspirator 47, for instances when only water inspiration into the master cylinder is desired.

Master cylinder head 69 is fixed to the upper end of the master cylinder 10 in the usual manner, by means of bolts 70 and nuts 10d (FIG. 1). Cylinder head 69 has an upstanding boss with a recess 25 which receives the bushing 300 of inspirator 47. Inspirator 47 has an elongated, upstanding, generally cylindrical casing 47a with an external annular flange 47b which rests upon the top of bushing 300. Bushing 300 is pressed into cylinder head 69. Flange 47b is attached to cylinder head 69 by any suitable means (not shown). Casing 47a also has a top square external flange 47c.

Piston or plunger 48 is slidably received within the cylindrical bore 47e of casing 47a. The lower portion 47d of this bore is tapered to serve as a seat which receives the correspondingly tapered lower face 48b of plunger 48. Plunger 48 has an upwardly opening cylindrical internal bore whose lower end is closed by bottom wall 48a. The upper portion of plunger 48 is of reduced external diameter so as to accommodate a coil spring 49 around its outer periphery. Wall 48a has inclined ports 54 extending from its upper face to tapered face 48b. Accordingly, these ports 54 are blocked when plunger 48 is in its bottom position of FIG. 16.

Bore 47e of casing 47a extends to the top thereof and is closed by a plate-like cover 301. This plate 301 has a stuffing box assembly 302, of conventional nature, on its upper face. Plate 301 has a depending boss 303 which is located in bore 47e. This boss 303 has an internal axial screw threaded bore 303a which extends to the bottom thereof. Shaft 58 extends turnably through stuffing box 302, and through a smooth bore in cover plate 301, and into bore 303a, and carries on its lower end a screw 58a which meshes with the threads of bore 303a. Shaft 58 has an external hand wheel 58b.

Below boss 303, a valve housing 59 is received in bore 47e. This valve housing 59 has an upper solid portion 59a of cylindrical shape which fits turnably within bore 47e.

A dog member 304 is interposed in bore 47c between boss 303 and valve casing 59 and has a hollow axial bore which receives shaft 58 and which is secured thereto by pin 304a. This dog 304 has further through bores which receive two driving pins 305. These pins 305 extend loosely into top recesses 59b of valve casing top portion 59a.

Below portion 59a, valve casing 59 is of reduced diameter and is threaded at 59c to receive a corresponding internally threaded portion of elongated sleeve 306. This sleeve 306 optionally has an eccentric external wall indicated by reference numeral 306a. This sleeve 306 extends below a side radial port 60 of external casing 47a, this port 60 being internally screw-threaded at 60a to receive any desired fitting. Thus, fuel oil, lubricating oil, or the like may be fed through port 60, the feeding being controlled by the turned position of sleeve 306, or if desired a safety device may be threaded into port 60.

Coil spring 49 extends between the lower end of sleeve 306 and a shoulder 48c of plunger 48. It will be apparent that by turning wheel 58b, the tension upon plunger 48 may be adjusted. It will also be apparent that plunger 48 may be moved upwardly by explosion within master cylinder 10, and in proportion to the force of the explosion.

As shown in FIG. 15, casing 47a has a radial water inlet port 51 which is adapted to receive water from water pump 45 (FIG. 3). Pump 45 is conventional and is not described in detail, and the connection of water pump 45 to port 51 is omitted.

Port 51 connects with the inner space of casing 47a above valve casing 59. Valve casing 59 has a chamber 307 just below the top thereof and this connects by ports 307a to the top face of valve casing 59. Hence, water can flow from port 51 to chamber 307. Chamber 307 connects with a passage 308 which extends downwardly to a hollow bore or water chamber 55 of valve casing 59. This chamber 55 extends to the bottom of valve casing 59 and is internally threaded at 55a at its lower end to receive the valve assembly 56. This valve assembly 56 is conventional and is not described in detail, and has the usual biasing spring 57 and a one-way check valve 56a opening downwardly.

The lower portion of valve casing 59 is frictionally located within the bore of plunger 48. Hence, the water discharged by valve assembly 56 flows downwardly into the bore of plunger 48.

The lower portion of member 48 is closed off by a one-way check valve assembly 52. Valve assembly 52 has a casing 52a which is slidable in the bore of plunger 48 and which has a through axial bore. Valve 52b is seated in the bottom of the bore of assembly 52, in the usual manner, with the usual biasing spring 53 interposed between casing 52a and valve 52b. Valve 52b has a depending threaded stem 52c which is screwed into an axial bore in wall 48a.

Valve assembly 52 is opened when pressure forces casing 52a downwardly relative to valve 52. Valve 56 is opened by vacuum in chamber 50. When an explosion occurs in cylinder 10, the force of the explosion raises plunger 48, thereby compressing the water in chamber 50. This forces the casing of valve 52 downwardly, permitting water to flow through ports 54 and into the master cylinder. Upon the downward return stroke of plunger 48, a further charge of water can flow through valve 56 into chamber 50. It will be apparent that the amount of water fed into the master cylinder is dependent upon the force of the explosion.

Alternate Inspirator for Fuel and Air

Figure 18:
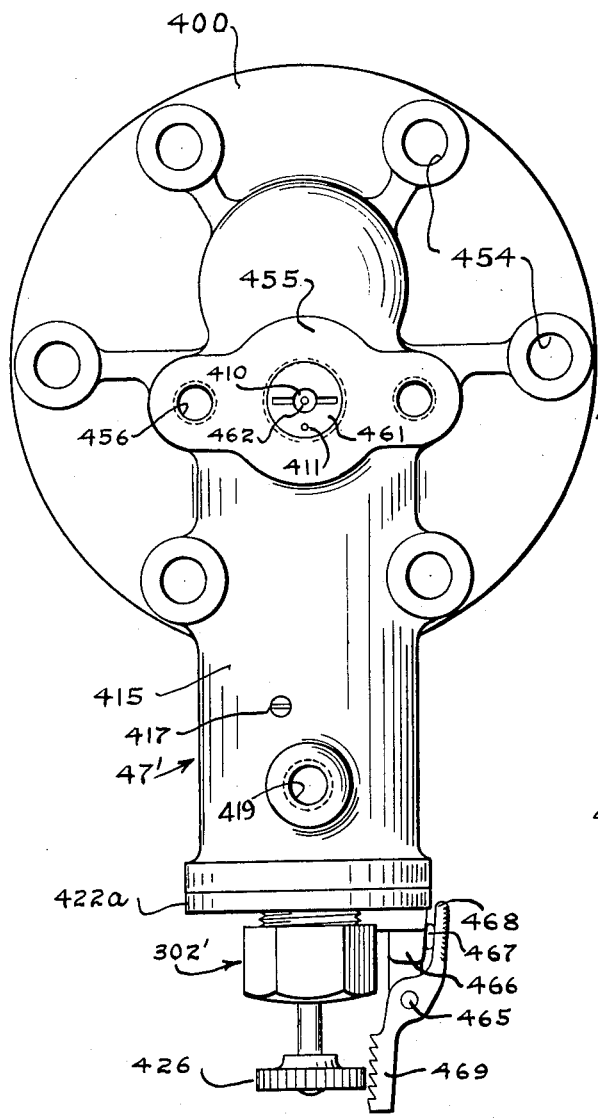
FIG. 18 is an outside elevation view of the inspirator assembly of FIG. 17.
Figure 17:
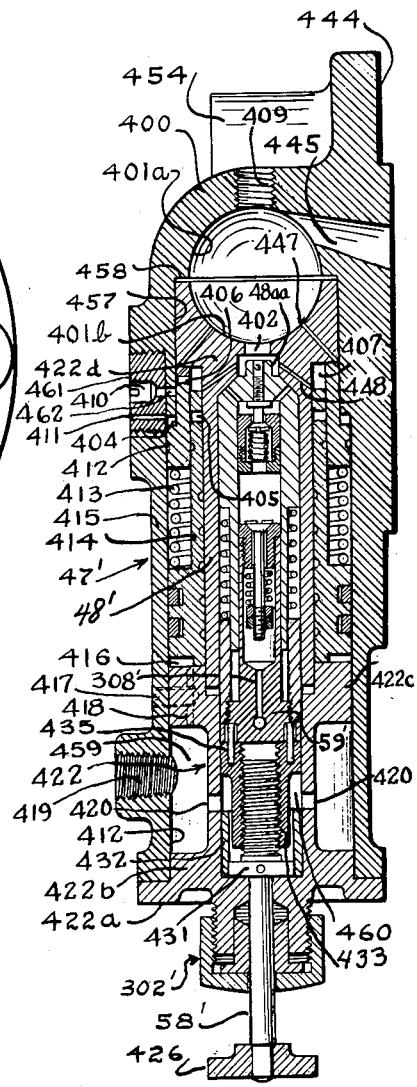
FIG. 17 is a vertical sectional view of a modified form of inspirator assembly.

Referring to FIGS. 17 and 18, the inspirator 47' shown therein is arranged to deliver both water and another fuel to the top of the cylinder 10 responsive to the ignition of the compressed fuel charge in the cylinder. This inspirator includes safety means isolating the fuel from the water outside the combustion chamber and operable upon failure of the water supply pressure to interrupt the fuel feeding.

The injector 47' is arranged to replace the cylinder head 69 and, for this purpose, includes a unitary body casting 400 formed with an annular seat 444 for a head gasket and apertured bosses 454 for the bolts 70. The part of body 400 forming the cylinder head is generally circular, as best seen in FIG. 18, and a generally tubular inspirator housing 415 projects from its outer surface and extends generally diametrically thereof. Housing portion 415 extends from just beyond the center of the head portion in one direction to substantially beyond the periphery of the head portion in the opposite direction.

Housing 415 has a relatively large diameter bore 421 extending from its outer end inwardly for about two thirds of the housing length, and continuous with a coaxial smaller diameter bore 457 terminating in an annular shoulder 458 lying in a diameter plane. A substantially hemispherical auxiliary combustion chamber section 401a is coaxial with bore 457, and an outwardly passage 445 connects chamber section 401a to cylinder 10. A threaded passage 409, normally closed by a plug, is provided for obtaining an indicator card reading.

A water cylinder 422 is seated in bores 421 and 457 and has a flange 422a engaging and secured to the outer end of housing 415, preferably with the interposition of a sealing gasket. Cylinder 422 is a general tubular body having an enlargement 422b, just inwardly of flange 422a, seating in bore 421. Inwardly of enlargement 422b, there is a second enlargement 422c, also seating in bore 421, and these two enlargements define an annular chamber 459. An enlargement 422d at the inner end of cylinder 422 seats in bore 457 in axially spaced relation to shoulder 458. The inner end of cylinder 422 is formed with an auxiliary combustion chamber section 401b, of hemispherical shape and complementing section 401a.

Housing portion 415 has a radial apertured and threaded water inlet boss 419 communicating with chamber 459, and ports 420 connect chamber 419 to a chamber 460 in cylinder 422. A passage 418 through enlargement 422c interconnects the portions of bore 421 inwardly and outwardly of this enlargement, and the flow through passage 418 is adjustably restricted by a screw valve 417. Thereby water at regulated pressure is supplied to water pressure chamber 416 for a purpose to be described.

Adjacent its inner end, housing portion 415 is joined with a relatively large threaded radial aperture receiving a screw plug 461 which communicates with a fuel injector (not shown) mounted on body 400 by bolts threaded into apertures 456 in a mounting surface 455. Plug 461 has a shouldered axial passage 410 coaxial with a port 462 in body 415, and passage 410 forms a seat for a fuel injection needle controlling fuel flow through the passage. Plug 461 also has a fuel passage 411 communicating with a fuel pressure chamber 404 above shoulder 458. Chamber 404 is partly defined by a fuel regulating sleeve 412 having a larger diameter portion engaged in bore 421 and a reduced extension engaged in bore 457 and having a port or ports 405, sleeve 412 acting as a fuel pressure regulating cut-off. A safety sleeve 414 is telescoped between cylinder 422 and sleeve 412, and has an enlarged outer end engaged in bore 421 and provided with sealing rings. The outer end face of sleeve 414 has a recess partly defining water pressure chamber 416. The inner end of safety sleeve 414 has a fuel cut-off port 405. A coil spring 413 biases sleeves 412 and 414 apart.

Cylinder 422 has ports 447 in through its inner end, and which are radial to combustion chamber 401 and terminate beneath the end of sleeve 412. An auxiliary combustion chamber 402 extends axially of the inner end of cylinder 422 in communication with chamber 401, and fuel ports 448 connect chamber 402 to the space 407 inwardly of the inner end of sleeve 414 and terminating just inwardly of such inner end.

As the parts inside cylinder 422 are, for the most part, identical with those of the inspirator of FIGS. 15 and 16, only the differences in construction will be described in detail. The piston or plunger 48' has a cylindrical boss 48a extending into auxiliary combustion chamber 402. The shaft 58' having the hand wheel 426 extends slidably and rotatably through a conventional stuffing box assembly 302' on the outer end of cylinder 422. Inwardly of the stuffing box, a collar 431 is pinned to shaft 58' and seats in an end recess in the inner surface of a water cut-off sleeve 432 slidable in cylinder 422. The inner end of shaft 58' is threaded into a water adjusting nut 433 connected by clutch pins 435 to valve casing 59' in a manner equivalent to that of the inspirator of FIGS. 15 and 16, but without interposition of dog member 304. Water flows through port 420 to the axial passage 308' of valve casing 59' in the same manner as previously described.

A ratchet lock 469 is pivoted at 465 to a bracket 466 on the end of cylinder 422, and is biased clockwise by a spring 467. Lock 469 has a manual release end 468. To cut off the water, shaft 58' is pushed inwardly so that sleeve 432 blocks ports 420, and lock 469 engages handwheel 426 to lock the parts in the cut-off position. The parts are readily released by pushing lock end 468.

The inspirator 47' operates in the following manner. The water pressure in chamber 416, restricted by passage 418 and screw 417, forces sleeve 414 inwardly so that ports 405 register with passages 448. Should the water pressure drop, sleeve 414 moves outwardly to block these passages. The fuel pressure in chamber 404 tends to bias sleeve 412 outwardly.

The water inspiration is effected by the explosion of the combustible mixture in the same manner as described and acting through auxiliary chamber 402 to lift the water piston. The compression pressure also acts through compression passages 447 against the inner end of sleeve 412 to move this sleeve outwardly to register its ports 406 with ports 405, 462 and passages 448. Thereby, fuel is inspirated into auxiliary sub-combustion chamber 402 to burn and provide power to the engine.

Conclusion

In operation, the fuel-air vapor mixture is supplied to port 23 from the charger whose piston 32 is coupled to crankshaft 17. During a power stroke of the main piston 15, piston 32 moves in a compression stroke forcing air under pressure through tube 36 and unit 39 into the mixing chamber 38 to vaporize a portion of the fuel in chamber 38. This vaporized fuel is fed to inlet port 23 of the main cylinder, compressed during the compression stroke and ignited in the main cylinder due to heat of compression. It will be observed that the fuel-air mixture which is injected into the combustion cylinder 10 before the compression stroke is completed is relied upon to provide the main explosion energy for the power stroke. Hence, elimination of an electrical ignition system can be accomplished without the corollary necessity of greatly increased bulk, strength and heat resistance of the operating parts.

While there have been disclosed a preferred embodiment of the invention and there have been indicated various changes, omissions and additions which can be made therein, it will be apparent that various other changes, omissions and additions may be made in the invention without departing from the scope and spirit thereof.

What is claimed is:

1. In an internal combustion engine having a piston reciprocating in a cylinder having a cylinder head, said piston having at least a fuel compression stroke toward said head and an opposite power stroke, the improvement comprising means for injecting a compressible charge into said cylinder ahead of said piston during the compression stroke thereof, said charge being adapted for combustion as the result of the compression thereof by the piston, and means for inspirating water into said cylinder behind said piston during the power stroke thereof for conversion of said water into superheated steam by the heat resulting from said combustion of said charge whereby to push said piston in its power stroke, said inspirating means having control means communicating with the interior of said cylinder adjacent said head and responsive to at least one change of condition of said charge resulting from the combustion thereof and having means for thereby actuating said inspirating means, said control means comprising a reciprocable member extending into said cylinder, and means biasing said member toward said cylinder, said member being movable in the direction away from said cylinder and against the action of said biasing means in proportion to the pressure generated in said cylinder as the result of the combustion of said charge, said actuating means including means for varying the quantity of water inspirated into said cylinder in proportion to the movement of said member, said injecting means comprising a source of compressed air, a source of fuel, means for aerating said fuel by said compressed air so as to carry said fuel in fine droplet form with said compressed air, means for delivering the fuel-air mixture to said cylinder, and means for varying the fuel-air ratio so as to vary the pressure generated as the result of the combustion of the charge.

2. Improvements in internal combustion engines in accordance with claim 1, said cylinder having a gas scavenging port positioned for clearance by said piston during the power stroke thereof and after the inspiration of water into said cylinder.

3. Improvements in internal combustion engines in accordance with claim 2, said improvements also including an air-tight crankcase communicating with said cylinder at the end thereof opposite said cylinder head for compression of air in said crankcase during the power stroke of said piston, said crankcase having an air intake port positioned to be cleared by said piston toward the end of its compression stroke, said crankcase having an air outlet pipe extending to said cylinder and communicating with the interior of said cylinder at a point cleared by said piston toward the end of the power stroke of said piston.

4. Improvements in internal combustion engines in accordance with claim 3, said improvements also comprising a throttle, said throttle having an air inlet, said throttle having a first air outlet connected to said air intake port of said crankcase, said throttle having a second air outlet connected to said source of compressed air, said source of compressed air having means for compressing the air received therefrom from said throttle in an amount proportional to the amount of air delivered thereto from said throttle, said throttle having means for varying independently the amount of air supplied to its respective outlets, and also having means for controlling the respective means for varying air flow in unison.

5. In an internal combustion engine having a piston reciprocating in a cylinder having a cylinder head, said piston having at least a fuel compression stroke toward said head and an opposite power stroke, the improvement comprising means for injecting a preliminary compressible fuel charge into said cylinder head of said piston during the compression stroke thereof and for causing combustion of said preliminary charge toward the end of said compression stroke, and means for inspirating a main fuel charge and water into said cylinder behind said piston during the power stroke thereof for conversion of said water into superheated steam by the heat resulting from combustion of said preliminary charge and for reaction of said main fuel charge and said superheated steam whereby to push said piston in its power stroke, said inspirating means having a reciprocable control member subjected to the pressure in said cylinder, means biasing said member toward said cylinder, said member being movable in the direction away from said cylinder and against the action of said biasing means in proportion to the pressure generated in said cylinder as the result of the combustion of said preliminary charge, and actuating means for said inspirating means which are coupled to and responsive to said control member and which include means for varying the quantity of main fuel charge and water inspirated into said cylinder in proportion to the movement of said control member.

6. The improvement in internal combustion engines, as claimed in claim 5, in which said inspirating means includes water pressure responsive cut-off means operable, upon a decrease in water pressure below a set value, to cut off such main fuel.

7. The improvement in internal combustion engines, as claimed in claim 6, in which said water pressure responsive means includes a pair of telescoped ported sleeves respectively subjected to water pressure and to fuel pressure, and means conjointly biasing said sleeves to cut-off positions.

8. The improvement in internal combustion engines, as claimed in claim 5, in which said inspirating means is mounted in a body forming a head for said cylinder and formed with an auxiliary combustion chamber in communication with said cylinder and having the main fuel charge and water inspirated thereinto.

9. In an internal combustion engine having a piston and a cylinder having a head, the improvement comprising means for injecting a compressible charge into said cylinder ahead of said piston during a compression stroke thereof, said charge being adapted for combustion as the result of the compression thereof by the piston, and means for inspirating water into said cylinder behind said piston during a power stroke thereof for conversion of said water into superheated steam by the heat resulting from said combustion of said charge whereby to push said piston in its power stroke, said inspirating means having control means communicating with the interior of said cylinder adjacent said head and responsive to at least one change of condition of said charge resulting from the combustion thereof and having means for thereby actuating said inspirating means, said injecting means including means for aerating fuel by compressed air, means for delivering said aerated fuel to said cylinder, and means for varying the fuel-air ratio so as to vary the pressure generated as a result of the combustion of the charge.

10. In an internal combustion engine having a piston and a cylinder having a head, the improvement comprising means for injecting a compressible charge into said cylinder ahead of said piston during a compression stroke thereof, said charge being adapted for combustion as the result of the compression thereof by the piston, and means for inspirating water into said cylinder behind said piston during a power stroke thereof for conversion of said water into superheated steam by the heat resulting from said combustion of said charge whereby to push said piston in in its power stroke, said inspirating means having control means communicating with the interior of said cylinder adjacent said head and responsive to at least one change of condition of said charge resulting from the combustion thereof and having means for thereby actuating said inspirating means, said control means comprising a reciprocable member extending into said cylinder, and means biasing said member toward said cylinder, said member being movable in the direction away from said cylinder and against the action of said biasing means in proportion to the pressure generated in said cylinder as the result of the combustion of said charge, said actuating means including means for varying the quantity of water inspirated into said cylinder in proportion to the movement of said member, said injecting means including means for aerating fuel by compressed air, means for delivering said aerated fuel to said cylinder, and means for varying the fuel-air ratio so as to vary the pressure generated as a result of the combustion of the charge.

References Cited in the file of this patent

UNITED STATES PATENTS

| | | |
|---|---|---|
| 1,496,453 | Dempsey | June 3, 1924 |
| 1,497,258 | Beals | June 10, 1924 |
| 1,528,665 | Fischer | Mar. 3, 1925 |
| 1,698,468 | Beals | Jan. 8, 1929 |
| 1,852,663 | Matthews | Apr. 5, 1932 |
| 2,491,429 | Thomas | Dec. 13, 1949 |
| 2,598,445 | Schneider | May 27, 1952 |
| 2,752,896 | Emele | July 3, 1956 |